Dec. 1, 1936.   R. E. BARCLAY   2,062,960
MEANS FOR AND METHOD OF INITIATING AND CONTROLLING
ELECTRICAL DISCHARGE IN A GASEOUS CONDUCTION PATH
Filed Nov. 30, 1934
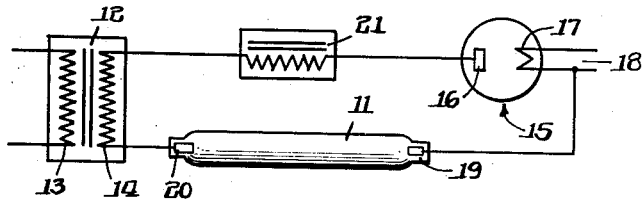
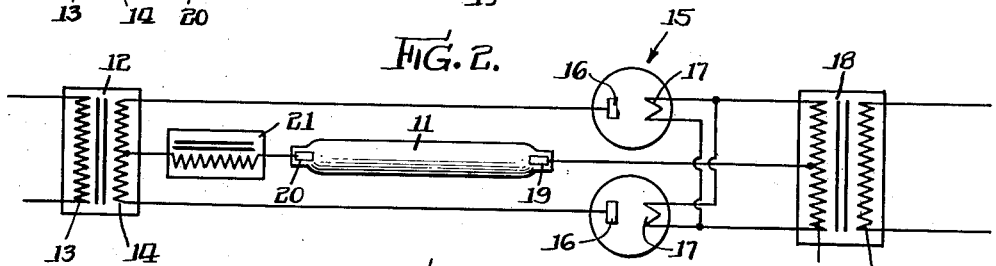
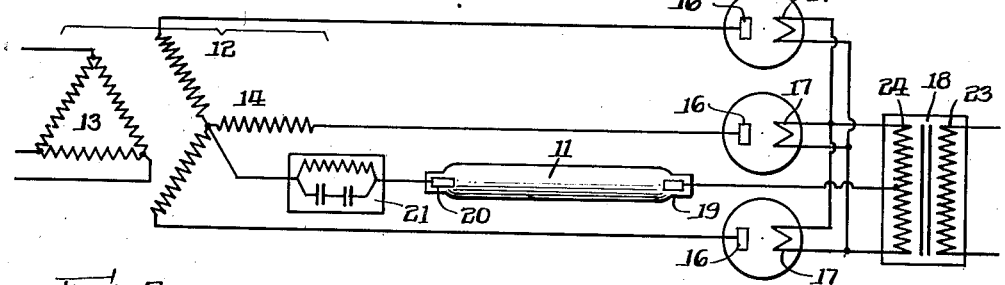
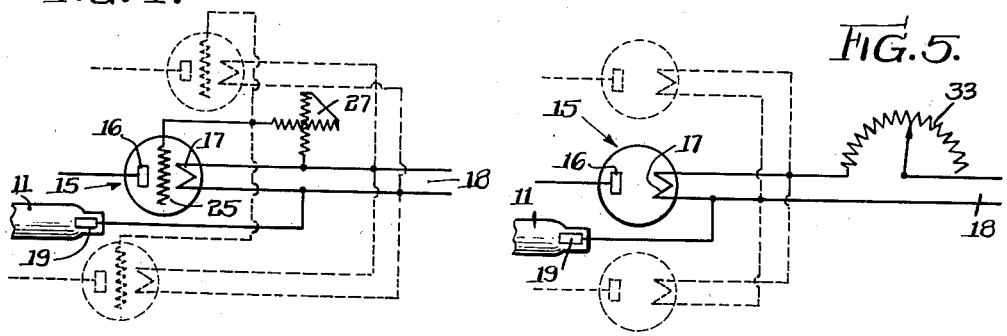
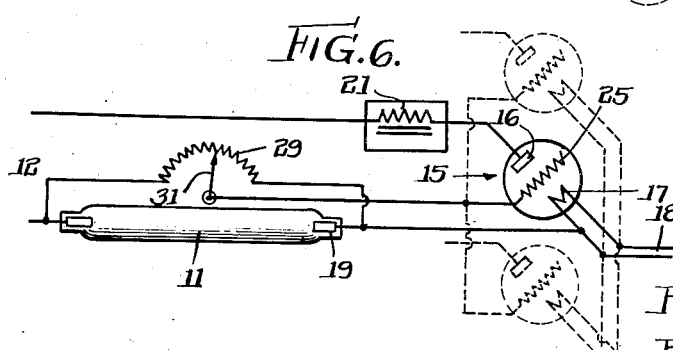
Inventor:
Robert E. Barclay
By: Cox + Moore
attys Patented Dec. 1, 1936

2,062,960

UNITED STATES PATENT OFFICE 2,062,960

MEANS FOR AND METHOD OF INITIATING AND CONTROLLING ELECTRICAL DISCHARGE IN A GASEOUS CONDUCTION PATH

Robert E. Barclay, Chicago, Ill.

Application November 30, 1934, Serial No. 755,310

3 Claims. (Cl. 176—124)

My invention relates in general to the art of illumination, and more particularly to the production and control of illumination resulting from electrical discharge in an ionized field.

Electrical discharge lamps, which are usually in the form of elongated tubes, filled with a gaseous medium capable of being excited to sustain electrical discharge, are known to those skilled in the art as positive column lamps, a common example being the so-called neon tube.

One of the problems encountered in the operation of positive column lamps is the difficulty of regulating the intensity of illumination produced by electrical discharge in the lamp, and it is an important object of my present invention to provide a means for and method of controlling the operation of a positive column lamp in order to alter the intensity of illumination provided by the operation of the lamp.

Another important object is to control the intensity of illumination produced by a positive column lamp by utilizing a thermionic valve in association with the circuit through which the controlled lamp is energized and by controlling the valve in order to regulate the intensity of illumination produced by the operation of the lamp; a further object being to employ variable grid-biasing means in association with the thermionic valve to accomplish the aforesaid control.

A further object is to adjust the grid bias of the lamp controlling valve by altering the phase relationship of the controlling impulse applied on said grid with respect to the current flowing through said valve from its anode to its cathode; a further object being to accomplish this phase-control by adjustable means, such as a variometer, interposed between the grid and the cathode of the valve.

A still further object is to adjust the grid bias of the lamp-controlling valve by means of an adjustable resistance bridge applied across the lamp and connected with the grid of the valve.

Yet another object is to provide for adjusting the grid bias of the lamp-controlling valve by controlling the electron emission of its cathode in order to control the energy delivered to the lamp through said valve; a further object being to control cathode excitation of the valve by means of an adjustable resistor or other control means in the cathode exciting circuit of said valve.

Another problem encountered in the operation of positive cathode lamps is the difficulty encountered in starting the same in operation at the relatively low applied potential required to maintain the lamp in operation after once started, it being understood that a positive column lamp ordinarily requires, for starting purposes, the application of electrical potential, between its electrodes, at voltages considerably higher than is necessary to maintain the lamp in operation. Another important object of my present invention, therefore, is to provide means for and a method of starting lamps, or other devices of the character mentioned at a delivered voltage equal to that required to maintain the device in operation after the same has been started.

Another important object of the invention is to provide for starting a discharge lamp without utilizing complicated switching apparatus, and without utilizing apparatus including moving parts, switches, and other devices apt to fail mechanically in service.

Another important object is to provide for utilizing, in starting a discharge lamp, an applied voltage only equal to that required to maintain the lamp in operation.

A further object is to utilize means in association with the lamp for applying electrical power having a fluctuating voltage wave, and for increasing the peak voltage of the potential applied to the lamp when the same is being started in order to afford sufficient potential on the lamp to cause the same to "strike", that is to say, to cause an initial discharge to occur in the lamp.

Another object is to utilize a potential having a fluctuating wave form, as for instance, sinusoidal alternating current, in operating a positive column lamp, said fluctuating potential being utilized without increasing its average or mean voltage, in order to start the lamp in operation by altering the wave form of the applied fluctuating potential so as to "peak" the voltage wave, and thus provide at the peaks thus produced, voltages sufficient to cause the lamp to "strike", and thereby start in operation.

Another important object resides in utilizing alternating current as delivered from a power supply system, at a voltage normally insufficient to start a lamp, but sufficient to maintain the lamp in operation after starting in operation by rectifying the delivered current in order to provide unidirectional current having a fluctuating voltage wave sufficient to maintain the lamp in operation, then modulating the wave, in order to provide peaks therein of sufficient magnitude to start lamp in operation, said peaks being accomplished by interposing reactance means in the lamp energizing circuit in order to produce the peaked wave form for starting.

Numerous other objects and advantages of the invention will be apparent from the following description, which, taken in connection with the accompanying drawing, discloses preferred embodiments of the invention.

Referring to the drawing:

Figure 1 is a diagrammatic representation of a discharge lamp and associated electrical system for operating the same with half-wave rectification of the applied current.

Figure 2 is a diagrammatic representation of a discharge lamp and associated electrical system for operating the same with full wave rectification of the applied current.

Figure 3 is a diagrammatic representation of a discharge lamp and associated electrical system for operating the same with full wave rectification of the applied current supplied from a three-phase source of power; and Figures 4, 5 and 6 respectively, illustrate various arrangements for controlling the intensity of illumination produced in the lamps connected in any lamp energizing system in accordance with my present invention.

To illustrate my invention, I have shown on the drawing discharge lamps 11 and various electrical systems for starting and operating the same from a source of alternating current electrical power, in accordance with my invention.

In Figures 1 and 2, the power source comprises the primary winding 13 of a transformer 12, which preferably has a magnetic leak in order to provide reactive characteristics whereby to limit current flow in the secondary winding 14 of the transformer, and for other purposes which will hereinafter be more fully explained.

In Figure 3 of the drawing, the power source comprises the primary windings 13 of a polyphase transformer, which are shown delta connected, the secondary winding 14 of the transformer being arranged in star connection. It is obvious, of course, that the invention is not necessarily restricted to the star and delta connection of the transformer windings shown in Figure 3. The polyphase transformer 12 also is preferably or may be formed to provide magnetic leakage therein for the purpose of limiting current flow in the secondary winding, and for other purposes hereinafter more fully described.

The primary winding of each transformer 12 may be connected to a suitable power source adapted to supply said windings with alternating current power.

The lamps 11 to be energized may be of any usual or preferred form, the lamps illustrated comprising an elongated sealed envelope containing a suitable gaseous medium, such as neon, crypton, argon, xenon, sodium dioxide, carbon dioxide, mercury vapor, or other gaseous media capable of being energized to support electrical discharge, and the envelope has spaced apart electrodes 19 and 20 operatively associated therewith. The electrode means and envelope may be of any suitable or preferred construction and material, although I prefer to form the electrodes, as disclosed in my copending application Serial No. 570,717, filed October 23, 1931; that is to say, of a cuprous alloy-containing silicon, and/or manganese, preferably in the following proportions:

|   | Percent by weight |
|---|---|
| Silicon | 3.06 |
| Manganese | 1.20 |
| Copper | 95.74 |

I do not wish, however, to restrict the invention to the material or form of the electrodes, but I find that the foregoing electrode material is highly satisfactory for use in positive column lamps generally, and in lamps operated in accordance with my present invention in particular.

The envelope of the lamp also may be of any preferred material, such as glass, quartz glass, colored glass, or glass adapted to filter out some of the rays produced by the excitation of the gaseous medium contained within the envelope. For example, I may wish to provide a lamp adapted to produce only ultra violet light. Such a lamp will have many advantages, is particularly adaptable for therapeutic purposes, and may be constructed simply by forming the lamp envelope of a material, such as cobalt glass, which will screen substantially all of the light rays produced within the envelope while freely permitting the passage of ultra violet rays.

As shown in Figure 1, the electrode 20 is or may be connected with one end of the secondary winding 14, the other end of said winding being connected through reactance means 21 with the anode or plate 16 of a thermionic valve 15. The valve 15 also includes a cathode 17 adapted to be energized from a suitable source of electrical power 18, the cathode 17 being also electrically connected with the electrode 19 of the lamp, so that the lamp circuit comprises the reactance means 21, the valve 15, and the lamp 11, connected in series with the winding 14 of the transformer. It is obvious that power delivered by the transformer may flow through the lamp circuit in one direction only, due to the presence of the valve 15 in the circuit, and it is obvious also that the voltage applied between the electrodes 19 and 20 will be a fluctuating wave comprising every other half cycle of the alternating current supplied from the power source.

In Figure 2, I have shown a pair of thermionic valves 15, the anodes 16 of which are respectively connected to the opposite ends of the secondary winding 14. The cathodes 17, which are preferably of filamentary character are connected together in parallel and between the opposite ends of the secondary winding 24 of a transformer 18, the primary winding 23 of which is connected to a suitable power source for the purpose of energizing the valve cathodes 17. The electrode 19 of the lamp 11 is electrically connected with the winding 24 at a point therein intermediate the filament connections on said winding, so that the lamp electrode 19 is connected with the cathode of both valves 15 through the transformer winding 24. The remaining lamp electrode 20 is electrically connected with the winding 14 at a point intermediate the spaced points, at which said winding is connected with the anodes of the valve. The electrode 20 is connected with the winding 14 preferably through reactance means 21, although the connection may be made directly and suitable reactance means interposed in both of the connections from the winding 14 to the anodes of the valves. It will be apparent that when alternating current is applied to the primary of the transformer 12 that full wave rectified power will be applied to the lamp 11 at the electrodes 19 and 20. The potential thus applied between the electrodes 19 and 20 will be a fluctuating wave comprising all half cycles of the alternations of the current delivered from the power source.

In Figure 3 of the drawing, I have shown a system for operating the lamp 11 from a three-phase source of alternating current power by means of the polyphase transformer 12, the secondary winding of which is arranged in star connection. In this system, I employ three thermionic valves 15, the anodes 16 of which are respectively connected each to a leg of the star-connected secondary winding 14. The cathodes 17 of the valves 15, which as shown, are of filamentary character, are connected together in parallel and between the opposite ends of the secondary winding 24 of a transformer 18, the primary winding 23 of which is connected to a suitable source for the purpose of energizing the valve cathodes 17. The electrode 19 of the lamp 11 is electrically connected with the winding 24 at a point therein intermediate the filament connections on said winding, so that the lamp electrode 19 is connected with the cathode of each of the valves 15 through the transformer winding 24. The remaining electrode 20 of the lamp is electrically connected with a neutral point in the secondary winding of the transformer 12, preferably through reactance means 21, although the connection may be made directly and suitable reactance means interposed in each of the connections from the winding 14 to the anodes of the valves. It will be apparent that when polyphase alternating current is applied to the primary of the transformer 12, that full wave rectified polyphase power will be applied to the lamp 11 at the electrodes 19 and 20.

In each of the systems shown in Figures 1, 2 and 3, the rectified power applied to the lamp 11 will be such as to constitute the electrode 19 as a cathode, that is to say, a positive electrode, while the electrode 20 is constituted an anode or negative electrode. The cathode may be of the type known as "hot", that is to say, adapted to be energized for electron emission from a suitable cathode exciting power source. I prefer, however, to utilize a so-called "cold" cathode requiring no excitation. The voltage, at which alternating current is supplied by the transformer 12, functioning as a power source, is, in each instance, not sufficient in magnitude to start the device 11 in operation by ionizing the gaseous medium and causing a discharge to strike between the electrodes 19 and 20. The power supplied is, however, sufficient to maintain the lamp in operation once it has been started. By rectifying the applied power by means of the valves 15 operating as rectifiers, I do not materially change the wave form or voltage of the power delivered in the system by the transformer 12, although by providing the transformer 12 with selected reactive characteristic, as by building the same with a magnetic leak as heretofore mentioned the wave form of the power delivered in the lamp circuit may be considerably altered in order to provide peak voltages in the fluctuating rectified potential delivered in the lamp circuit so that the peaks thus imparted may be of sufficient magnitude to cause the lamp to start in operation. I prefer, however, to accomplish the peaking of the voltage wave by the reactive means 21, which illustrated in the drawing, may comprise a choke coil or other suitable reactive arrangement such for instance, as the parallel resistance and capacity system illustrated in Figure 3. If desired, the reactance means 21 may be made variable in order to afford additional flexibility of control.

By rectifying the alternating current applied to the transformer 12, direct current power having a rippled wave form is applied to the lamp 11. The fluctuating or rippled character of the rectified potential assists in starting the lamp in operation and the reactive means 21 modulates the rippled wave form in order to create peak voltages sufficiently high enough to start the tube in operation without actually increasing the mean voltage applied on the transformer 12. The transformer, as heretofore stated, is preferably arranged to leak magnetically when in operation in order to assist in establishing peaks in the wave form of voltage applied between the electrodes 19 and 20. It is not, however, necessary to employ a magnetically leaky transformer, since the reactance means 21 is mainly responsible for the creation of the voltage peaks. Where the transformer does not have the desired reactive characteristics imparted by magnetic leakage therein, it is ordinarily desirable to utilize reactance means in each of the anode connections between the transformer and the anodes of the valves 15. If a leaky transformer is utilized in the system, however, it is ordinarily necessary to employ reactive means only in the connection between the transformer and the electrode 20 of the lamp, so that by employing a transformer having the desired reactive characteristics, it is possible in arrangements similar to those shown in Figures 2 and 3, to reduce the necessary equipment to some extent.

After the lamp has started in operation, it is not, of course, necessary to maintain the peaked character of the voltage wave. However, the fact that the wave is of peaked character does not at all impair the operating efficiency of the lamp but, in fact, may assist in maintaining the lamp in operation even at reduced intensity as contemplated in the arrangements shown in Figures 4, 5 and 6.

In Figures 4, 5 and 6, I have shown various systems or circuit arrangements adapted for application in any of the systems shown in Figures 1, 2 and 3, whereby the operation of the lamp may be controlled in order to vary the intensity of illumination produced by the lamp.

I may accomplish the control by varying the current flowing in the lamp energizing circuit, or by varying the average voltage applied between the electrodes 19 and 20. To this end, as shown in Figures 4 and 6, the valve device 15 is provided with a grid 25 adapted to control electron flow in the valve between its cathode 17 and its anode 16 to the end that lamp actuating current flowing between the anode and cathode may be controlled. The grid 25, in the arrangement shown in Figure 4, is connected with the cathode 17 through a regulating device 27 by means of which biasing impulses may be applied on the grid. As shown, the device 27 comprises a variometer, although other adjustable means for altering the phase of the grid with respect to the cathode, or otherwise controlling the grid in terms of the current flow between anode and cathode may, of course, be employed.

As shown in Figure 6, I may employ a resistance 29 bridging the lamp 11. The resistance, of course, is of sufficiently high value to substantially prevent the passage of the lamp energizing current so that the presence of the resistance will not effect the operation of the lamp. An adjustable slide 31, which may be set to any desired position on the resistance, is provided and connected with the control grid 25 of the valve, so that by adjusting the shiftable contact 31 on the resistance 29, any desired bias may be applied to the grid in order to accomplish control of the valve, and hence control of the illumination produced by the lamp.

I may also employ means for directly controlling the excitation of the cathode of the valve in order to accomplish control of the intensity of the illumination produced in the lamp.

As shown in Figure 5, I may utilize an adjustable resistor 33, in the filament circuit of the valve 15, so that, by controlling the excitation of the filament 17 and thereby controlling the electron emission by said filament, I may regulate the amount of current flowing in the lamp circuit without effecting the voltage applied to the lamp. By changing the current, of course, the current intensity in the lamp, which is a factor determining the amount of illumination produced by the lamp, is or may be altered.

While I have shown, in Figures 4, 5 and 6, in solid lines, the application of my control system to the single phase half wave operation of a lamp, I may, of course, as indicated in dotted lines, apply the control in systems like those shown in Figures 2 and 3, wherein the lamps are respectively operated with single and polyphase full wave rectification, it being understood in such cases that the electrode 19, of the lamp 11, will be connected, as shown in Figures 2 and 3, to a neutral point in the power distribution system, from which the filaments of the valves are energized, rather than by connecting the same directly with the filament as shown in Figures 4, 5 and 6. It will be understood from the foregoing description, that I provide for operating positive column lamps from a source of alternating current power available at a voltage insufficient to start the lamp in operation, and that starting is accomplished by preferably rectifying the available, relatively low voltage power, in order to provide direct current power having a rippled characteristic, and by delivering the rectified power wave through a lamp exciting circuit containing means for modulating the characteristic voltage wave in order to periodically produce peak voltages of sufficient magnitude to start the lamp in operation.

While I prefer to rectify the available power and apply it in rectified and modulated condition to the lamp, I may provide for utilizing alternating current power without rectifying the same by simply modulating the alternating current directly in order to produce peak voltages capable of causing a discharge to strike or be set up in the lamp. In such case, the electrodes 19 and 20 will operate in the lamp alternately as anode and cathode. My system, however, requires no complicated switching mechanism or other means for initially applying starting potentials, from a power source at relatively high voltage, to the lamp to set the same in operation. In other words, no electrical or mechanical change in the operation or control of the system is necessary in order to start and continue the lamp in operation. My system also provides for the control of the intensity of illumination produced by the lamps and the mode of applying lamp energizing power facilitates the control of illumination intensity by affording a peak voltage wave to the lamp, said wave having characteristics tending to maintain the lamp in operation because of the relatively high voltage prevailing at the voltage peaks even though the power, supplied to the lamp, may be considerably reduced by the operation of the illumination intensity control.

The arrangement I have provided for operating and controlling positive column lamps is simple and efficient, requires a minimum of apparatus, and contains no moving parts susceptible to failure in service.

It is thought that the invention and numerous of its attendant advantages will be understood from the foregoing description, and it is obvious that numerous changes may be made in the form, construction and arrangement of the several parts without departing from the spirit or scope of my invention or sacrificing any of its attendant advantages, the forms herein described being preferred embodiments merely for the purpose of illustrating the invention.

Having thus described my invention, what I claim as new and desire to secure by Letters Patent is:

1. An electric system comprising a transformer having a primary winding, adapted to be energized from an alternating current source, and a secondary winding, a rectifier, reactive means, and means for electrically connecting said secondary winding, said rectifier, and said reactive means in an electric circuit including a discharge device having anode and cathode electrodes whereby said discharge device may be energized by rectified electrical power applied between its electrodes and having a voltage wave characterized by peaks interposed by the action of the reactive means.

2. An electric system comprising a transformer adapted to be energized from an alternating current source, a circuit including rectifier means comprising an electronic device having an anode and a cathode, a discharge device having anode and cathode electrodes, the cathode of said rectifier connected with the cathode electrode of the discharge device, said transformer having a winding electrically connected at spaced points therein respectively with the anodes of the rectifier and discharge device, and reactive means interposed in said circuit whereby said discharge device may be energized by means of rectified electrical power, applied between its anode and cathode electrodes and having a voltage wave characterized by peaks imposed therein by the action of the reactive means.

3. An electric system as set forth in claim 2, said transformer secondary winding being formed with a neutral tap and the rectifier means comprising a plurality of electronic devices each having an anode connected respectively to the transformer winding on opposite sides of said tap, said electronic devices each having a cathode connected together and to the cathode of the discharge device, and the discharge device having an anode connected with the neutral tap of the transformer winding.

ROBERT E. BARCLAY.